United States Patent [19]

Persinger

[11] 4,423,704
[45] Jan. 3, 1984

[54] METHOD FOR IMPROVING EFFICIENCY OF AN INTERNAL COMBUSTION IRRIGATION ENGINE

[76] Inventor: James G. Persinger, P.O. Box 477, 1108 Industrial St., Hugoton, Kans. 67951

[21] Appl. No.: 302,495

[22] Filed: Sep. 16, 1981

[51] Int. Cl.³ .............................................. F02M 25/04
[52] U.S. Cl. .............................. 123/25 R; 123/25 A; 123/2; 261/18 A
[58] Field of Search ................. 123/25 R, 25 A, 25 L, 123/2; 261/18 A

[56] References Cited

U.S. PATENT DOCUMENTS

| | | | |
|---|---|---|---|
| 2,537,495 | 1/1951 | Wallin | 261/18 R |
| 2,627,934 | 2/1953 | Martinek | 261/97 |
| 2,843,216 | 7/1958 | Powell | 123/25 A |
| 3,991,724 | 11/1976 | Geiser | 123/25 R |
| 4,068,625 | 1/1978 | Brown | 123/25 A |
| 4,289,508 | 9/1981 | Robert | 123/25 A |
| 4,306,519 | 12/1981 | Schoenhard | 123/25 R |

*Primary Examiner*—Ira S. Lazarus
*Attorney, Agent, or Firm*—Frank Frisenda, Jr.

[57] ABSTRACT

A method for improving efficiency of an internal combustion irrigation engine is provided by the present invention. In one embodied form, the method comprises the steps of: channelling an inlet air stream to the engine through a single pass air cooler at a flow rate of between about 200 cubic feet per minute and about 5000 cubic feet per minute, the air cooler being a counter current flow packed cooling tower utilizing irrigation water as cooling means; directly contacting the inlet air stream with irrigation water in the air cooler to bring the temperature of the air stream within a range of between about 55° F. and about 75° F. and a relative humidity within a range of between about 90% and 100%; admixing the cooled and humidified inlet air stream with fuel; and directing the resultant gaseous mixture to a combustion chamber of the internal combustion irrigation engine. Accordingly, the inventive method is designed for improving the performance and longetivity of irrigation engine in terms of increased engine power, reduced fuel consumption and reduced engine maintenance.

9 Claims, 1 Drawing Figure

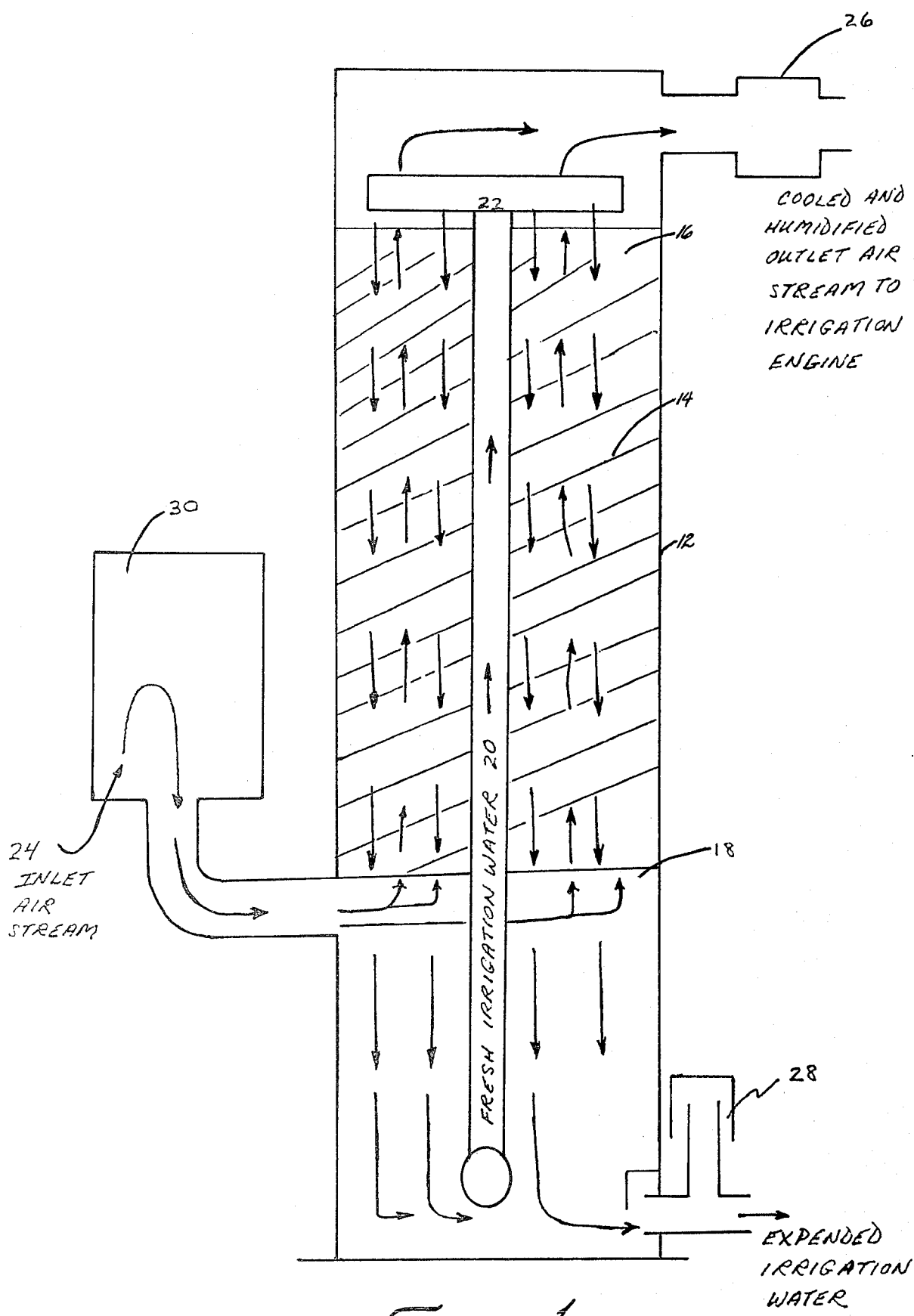

METHOD FOR IMPROVING EFFICIENCY OF AN INTERNAL COMBUSTION IRRIGATION ENGINE

BACKGROUND OF THE INVENTION

This invention relates to a method for improving the efficiency of an internal combustion irrigation engine, in terms of reduced fuel consumption, reduced engine maintenance and increased engine power.

In the United States, certain farming areas in the midwest, for example, overlie petroleum deposits. In these areas, it is not uncommon for farmers to drill a well so as to tap a fuel source such as natural gas and then use this gas to power an internal combustion engine which is used to drive an irrigation pump. Accordingly, the underground water is brought up from the earth by pumping and discharging it into a suitable irrigation network to provide water for crop growth.

Such an internal combustion irrigation engine utilizing a fuel source such as natural gas, liquified petroleum or diesel fuel, of course, also makes use of air to provide oxygen necessary for combustion. In some geographical areas the ambient air is particularly hot and relatively dry and may deleteriously contain foreign particles such as significant amounts of dust leading to poor engine performance and excessive wear on engine components such as exhaust valves, turbo chargers, cylinders, heads, valves, bearings and like.

Accordingly, those concerned with the utilization of various geographical areas for agricultural purposes have recognized a significant need for improving efficiency of an internal combustion irrigation engine, both in terms of improving engine performance and longevity at a modest cost and by utilizing readily available natural resources for effecting such improvement. The present invention fulfills these needs.

SUMMARY OF THE INVENTION

In accordance with the present invention, a method is provided for improving efficiency of an internal combustion irrigation engine by cooling and humidifying within specified ranges an inlet air stream to the engine.

In one presently preferred embodied form, the method comprises the steps of: channelling an inlet air stream to the engine through a single pass air cooler at a flow rate of between about 200 cubic feet per minute and about 5000 cubic feet per minute, the air cooler being a counter current flow packed cooling tower utilizing irrigation water as cooling means; directly contacting the inlet air stream with irrigation water in the air cooler to bring the temperature of the inlet air stream within a range of between about 55° F. and about 75° F. and a relative humidity within a range of between about 90% and about 100%; admixing the cooled and humidified inlet air stream with fuel and directing the resultant gaseous mixture to a combustion chamber of the internal combustion irrigation engine.

In more detail, the preferred apparatus for effecting cooling and humidification comprises a single pass counter current cooling tower having a diameter to depth ratio of packing of at least a one to one ratio and preferably a diameter to depth ratio of packing of one to two. The cooling tower packing may be constructed of various conventional materials such as porcelain, plastic or stainless steel saddles, rings, or the like providing a free area within a range of from about 60% to about 95%.

Typically, the flow rate of irrigation water through the cooler will range from about 3 gallons per minute to about 25 gallons per minute but may be suitably varied to assure the end characteristics of the inlet air supply in terms of coolness and humidification as previously discussed.

The method of the present invention provides a resultant gaseous mixture which uniquely promotes improved burning of the fuel supply thereby providing a lower burn temperature which will burn at a slower rate. Moreover, the relatively lower burn temperature serves to reduce wear and stresses on components of the irrigation engine such as cylinders, heads, valves, gaskets, headbolts, pistons and bearings.

Other features and advantages of the present invention will become apparent from the following more detailed description, taken in conjunction with the accompanying drawings, which will illustrate by way of example, the principles of the invention.

BRIEF DESCRIPTION OF THE DRAWINGS

FIG. 1 is a cross-sectional view of a single pass counter current packed cooling tower with associated components for effecting the cooling and humidifying of an inlet air stream to an internal combustion irrigation engine in accordance with the present invention.

DESCRIPTION OF THE PREFERRED EMBODIMENTS

In accordance with the present invention, a method is provided for improving efficiency of an internal combustion irrigation engine by cooling and humidifying, within specified ranges, an inlet air stream to the engine.

In one presently preferred embodied form, the method comprises the steps of: channelling an inlet air stream to the engine through a single pass air cooler at a flow rate of between about 200 cubic feet per minute and about 5000 cubic feet per minute, the air cooler being a counter current flow packed cooling tower utilizing irrigation water as cooling means; directly contacting the inlet air stream with irrigation water in the air cooler to bring the temperature of the inlet air stream within a range of between about 55° F. and about 75° F. and a relative humidity within a range of between about 90% and about 100%; admixing the cooled and humidified inlet air stream with fuel and directing the resultant gaseous mixture to a combustion chamber of the internal combustion irrigation engine.

As shown in the drawings, and with reference to FIG. 1, the illustrated apparatus for effecting the method in accordance with one embodiment of the present invention comprises a generally cylindrical single pass tower (denoted 10) for cooling and humidifying an inlet air stream to an internal combustion irrigation engine (not shown). The tower 10 comprises outer shell 12 constructed from suitable corrosion resistance metals or plastics.

The shell 12 encases a bed of packing material 14 typically composed of various conventional materials such as porcelain, plastic or stainless steel, saddles, rings or the like. One particularly preferred packing is a commercially available one inch diameter "Flex Ring" made of a polyvinyl chloride polymer. A pair of screens 16 and 18 are disposed at opposite ends of the bed 14 to support and contain the packing in a fixed position inside the shell 12.

The depth of the packing bed 14 must be coordinated with the diameter and length of the outer shell 12 to provide a diameter to depth of packing ratio of at least one to one. The preferred diameter to depth of packing ratio, however, is one to two. For example, a packing bed diameter of 16 inches has been found particularly suitable with a depth of packing of from 2 to 2½ feet, utilizing 1 inch diameter plastic rings. Moreover, the packing bed 14 must provide a minimum free area of at least 60% ranging to a maximum free area of 95% to achieve the specified end characteristics of temperature and humidity of the inlet air stream by a single pass through the tower 10.

A feed stream 20, of fresh irrigation water, typically supplied at an ambient temperature of from about 50° F. to 70° F., is flowed from the base of the tower shell 12 by means of centrally disposed tubing upwardly through the packing bed 14 to a distributor head 22 provided in the top portion of the shell 12. Once received at the distributor head 22, the fresh irrigation water stream 20 is substantially uniformly dispersed over the packing bed 14 and trickles downward to directly contact, in a counter current manner, an inlet air stream 24 being fed upwardly from the base of the tower shell 12.

The feed stream 20 of fresh irrigation water is fed to the tower 10 at a flow rate of between about 3 gallons per minute and about 25 gallons per minute with a preferred flow rate of from about 3 gallons per minute to about 5 gallons per minute. Should the pump which brings the underground water up from the earth not be sufficient to flow the feed stream 20 at the foregoing rate, a supplemental pumping means can of course be utilized. Typically, a suitable irrigation engine will have a horse power within a range of from about 20 to about 1,000 horse power and will be capable of meeting the foregoing flow rate requirement.

The cooled and humidified inlet air stream 24 is flowed from the top of tower 10, optionally through a mist eliminator 26 to the carburetor of the internal combustion irrigation engine for admixture with fuel, for instance, natural gas, liquified petroleum, diesel fuel or the like.

The expended feed stream of irrigation water is collected from the lower portion of the tower 10, by gravity flow and optional pump to be discharged from the cooling and humidifying system to a suitable irrigation network to provide water for crop growth. The water discharge stream may also include a safety overflow valve 28 to accommodate excessive buildups of the expended stream in the tower 10.

In geographical areas where excessive dust or foreign matter in the ambient air supply occurs, an air filter 30 may also be included in the cooling and humidifying system. However, outside of such geographical areas, the direct contact between the inlet air stream 24 and the feed stream 20 will be sufficient to minimize the amount of dust and foreign matter in the air stream 24 before it reaches the engine carburetor and ultimately the combustion chamber where ignition of the resultant gaseous mixture is effected.

With respect to the means for channelling the inlet air stream at a flow rate of from about 200 cubic feet per minute to about 5000 cubic feet per minute, the flow rate may be achieved by suitable vacuum pump to bring the stream to the desired range. An optimum flow rate of about 400 cubic feet per minute has been found to be most effective in the single pass counter current contact procedure.

Accordingly, the inventive method is designed for improving the performance and longevity of internal combustion irrigation engines in terms of increased engine power, reduced fuel consumption and reduced engine maintenance. These advantages are achieved in part by lowering the temperature at which combustion takes place and slowing the burn rate of the air/water vapor/fuel mixture providing for an extended burn period. The extended burn period assures that useful energy of combustion is released further after zero crank angle, therefore engine torque and BMEP can be increased significantly on the engine.

The lower burn temperatures and lower peak firing pressures serve to extend life of the engine components including exhaust valves, turbo charges, cylinders, heads, valves, gaskets, head bolts, pistons, bearings and the like.

While a particular form of the invention has been illustrated and described, it will be apparent that various modifications can be made without departing form the spirit and scope of the invention.

I claim:

1. A method for improving efficiency of an internal combustion irrigation engine by cooling and humidifying an inlet air stream to the engine, the method comprising the steps of:

channelling an inlet air stream to the engine through a single pass air cooler at a flow rate of between about 200 cubic feet per minute and about 5000 cubic feet per minute, said air cooler being a counter-current flow packed cooling tower utilizing irrigation water as cooling means;

directly contacting said inlet air stream with irrigation water in said air cooler to bring the temperature of said air stream within a range of between about 55° F. and about 75° F. and to bring the relative humidity of said air stream within a range of from about 90% to about 100%;

mixing the cooled and humidified inlet air stream with fuel; and directing the resultant gaseous mixture to a combustion chamber of said internal combustion irrigation engine for ignition.

2. The method as defined in claim 1 wherein said inlet air stream is channelled through a single pass air cooler at a flow rate of about 400 cubic feet per minute.

3. The method as defined in claim 1 and further comprising the step of filtering said inlet air stream to remove dust particles and foreign matter in said air stream prior to effecting cooling and humidifying of said air stream.

4. The method as defined in claim 1 wherein said irrigation water in said air cooler has a flow rate through said air cooler within a range of from about 3 gallons per minute to about 25 gallons per minute.

5. The method of claim 1 wherein said irrigation water through said air cooler has a flow rate of between about 3 gallons per minute and 5 gallons per minute.

6. The method of claim 1 wherein said counter-current flow pack cooling tower comprises a packing bed having a diameter to depth of packing ratio of one to one.

7. The method of claim 1 wherein said counter-current flow pack cooling tower comprises a packing bed having a diameter to depth of packing ratio of one to two.

8. The method of claim 6 wherein said packing bed has a free area within a range of from about 60 to about 95%.

9. The method of claim 7 wherein said packing bed has a free area within a range of from about 60 to about 95%.

* * * * *